(12) United States Patent
Lu

(10) Patent No.: US 7,175,192 B1
(45) Date of Patent: Feb. 13, 2007

(54) FOLDABLE BICYCLE

(76) Inventor: I Shyong Lu, 1F, No. 53, Bo-Guen Rd., Taichung City (TW)

( * ) Notice: Subject to any disclaimer, the term of this patent is extended or adjusted under 35 U.S.C. 154(b) by 0 days.

(21) Appl. No.: 11/328,222

(22) Filed: Jan. 10, 2006

(30) Foreign Application Priority Data

Oct. 21, 2005 (TW) ............... 94218375 U

(51) Int. Cl.
*B62K 15/00* (2006.01)
*B62K 19/18* (2006.01)
*B62K 19/46* (2006.01)
*B62J 7/04* (2006.01)

(52) U.S. Cl. ............ 280/287; 280/278; 280/301; 224/418; 224/423

(58) Field of Classification Search .......... 280/287, 280/278, 293, 301, 302
See application file for complete search history.

(56) References Cited

U.S. PATENT DOCUMENTS

| 559,698 | A | * | 5/1896 | Gaston | 280/296 |
| 1,920,004 | A | * | 7/1933 | Currie | 16/47 |
| 4,995,626 | A | * | 2/1991 | Montague | 280/231 |
| 5,052,706 | A | * | 10/1991 | Tsai et al. | 280/287 |
| 6,425,598 | B2 | * | 7/2002 | Murayama | 280/278 |
| 6,991,246 | B1 | * | 1/2006 | McCalip | 280/474 |
| 2006/0038378 | A1 | * | 2/2006 | Lee | 280/278 |
| 2006/0061060 | A1 | * | 3/2006 | Chen | 280/287 |
| 2006/0175797 | A1 | * | 8/2006 | Sanders | 280/287 |

* cited by examiner

*Primary Examiner*—Lesley D. Morris
*Assistant Examiner*—Marc A. Scharich
(74) *Attorney, Agent, or Firm*—Rabin & Berdo, P.C.

(57) ABSTRACT

A foldable bicycle includes a frame. A first foldable device is connected to a top tube of the frame so as to fold a front wheel together with a head tube and a handlebar backward at the first foldable device such that the front and rear wheels are located parallel with each other. At least one assistant wheel is connected to a lower end of a down tube so that the at least one assistant wheel cooperates with the front and rear wheels to form a stable triangle support arrangement and the foldable bicycle can be easily moved by the at least one assistant wheel cooperating with the front and rear wheels. A carry rack is located above the rear wheel, which can be positioned by engaging pivot rods of the carry rack with engaging members on two support rods connected to a hub of the front wheel.

1 Claim, 8 Drawing Sheets

FOLDABLE BICYCLE

BACKGROUND OF THE INVENTION

1. Field of the Invention

The present invention relates generally to a foldable bicycle which can be easily moved in a folded state.

2. The Prior Arts

A conventional bicycle can be carried on a top of a vehicle or can be carried by a bicycle rack attached at a rear end of the vehicle. However, the bicycle cannot be folded to reduce its size so that when the bicycle is stood on the top of the vehicle, it might be tangled by trees or tunnels. The bicycle positioned on the bicycle rack affects a driver's ability to check the cars that follow the vehicle and the bicycles might drop from the bicycle rack. Besides, when users want to carry the bicycle to take buses, certain equipments have to be equipped on hand or the bicycles cannot be entered into the buses.

A foldable bicycle is developed so that the users can fold the bicycle and carry the folded bicycle to get on buses or any public transportation system. Nevertheless, the folded bicycle is too heavy to conveniently carry for most of the users.

The present invention intends to provide a foldable bicycle that includes an assistant wheel which can be cooperated with a front wheel and a rear wheel so that the users can easily move the folded bicycle.

SUMMARY OF THE INVENTION

A primary objective of the present invention is to provide a foldable bicycle which comprises a frame including a top tube, a down tube connected to the top tube, a head tube connected to the top tube, a front fork connected to the head tube and a front wheel connected to the front fork, a handlebar stem connected to the head tube and a handlebar connected to the handlebar stem, a seat stem connected to the down tube and a seat connected on the seat stem, a pair of seat stay and chain stay connected to the down tube, and a rear wheel connected to the seat stay. A first foldable device is connected to the top tube which is folded at the first foldable device to parallel the front wheel and the rear wheel. At least one assistant wheel is connected to a lower end of the down tube so as to cooperate with the front and rear wheels such that the foldable bicycle can be moved by the at least one assistant wheel and the front and rear wheels.

Another objective of the present invention is to provide a foldable bicycle wherein a carry rack is positioned above the rear wheel and two support rods are connected to a hub of the front wheel. Two engaging members are connected to the two support rods respectively. The carry rack includes two pivot rods which are sized to be engaged with the engaging members when the top tube is folded at the first foldable device.

BRIEF DESCRIPTION OF THE DRAWINGS

The present invention will be apparent to those skilled in the art by reading the following detailed description of preferred embodiments thereof, with reference to the attached drawings, in which.

DETAILED DESCRIPTION OF THE PREFERRED EMBODIMENT

Figure 1:
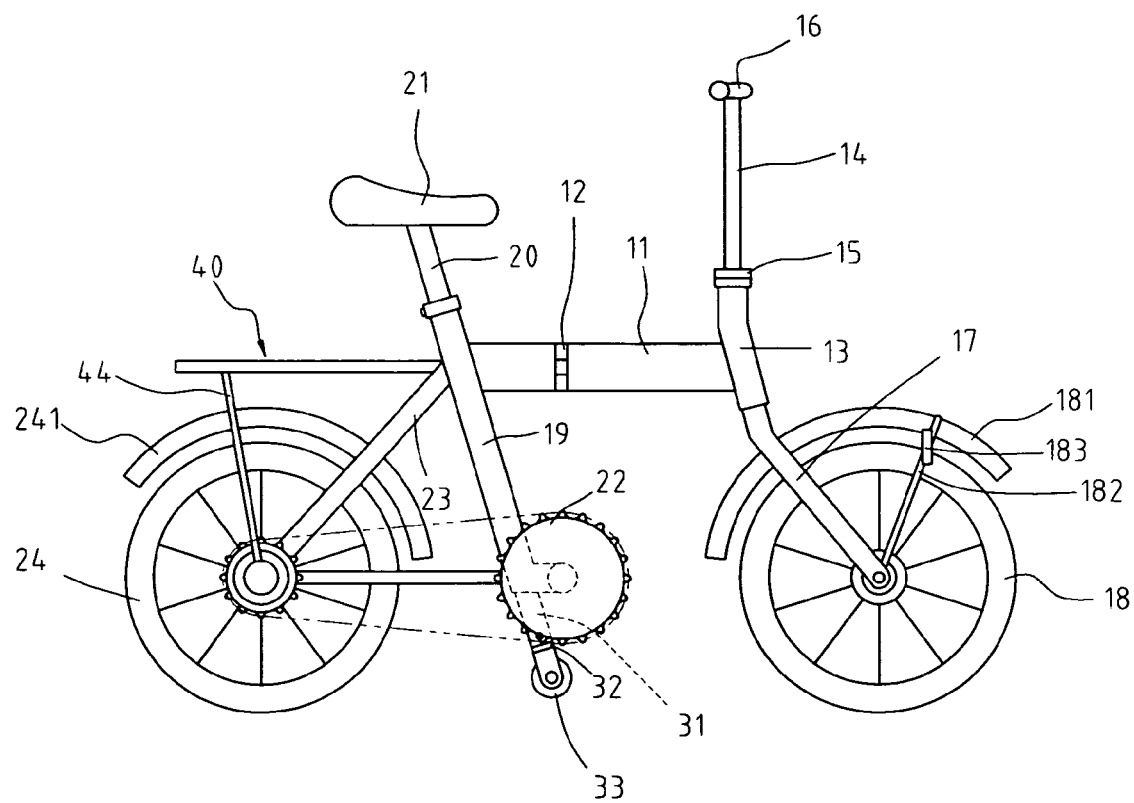
FIG. 1 is a side view of a foldable bicycle in accordance with the present invention.
Figure 4A:
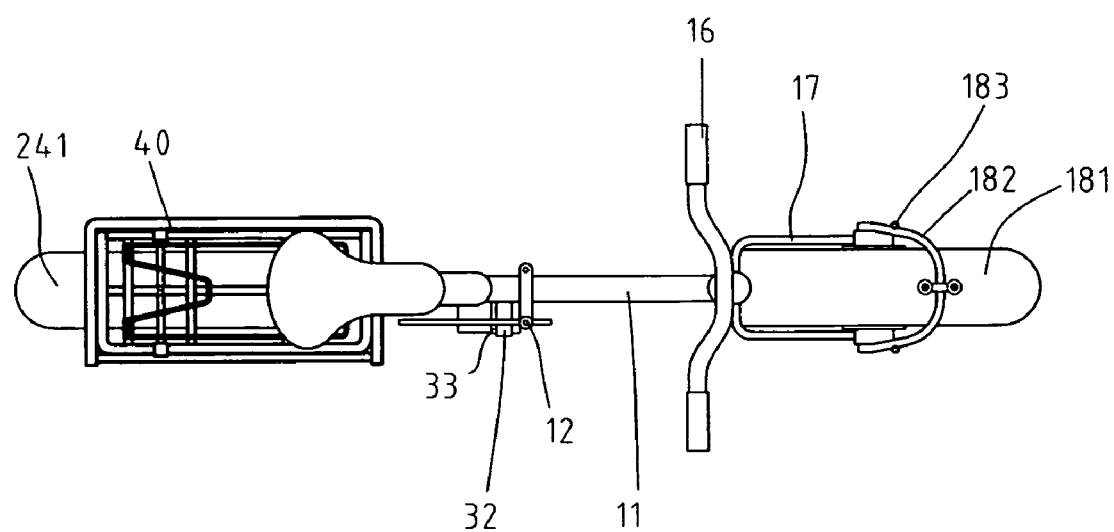
FIG. 4A shows a top view of the bicycle of the present invention wherein the carry rack is folded.
Figure 4B:
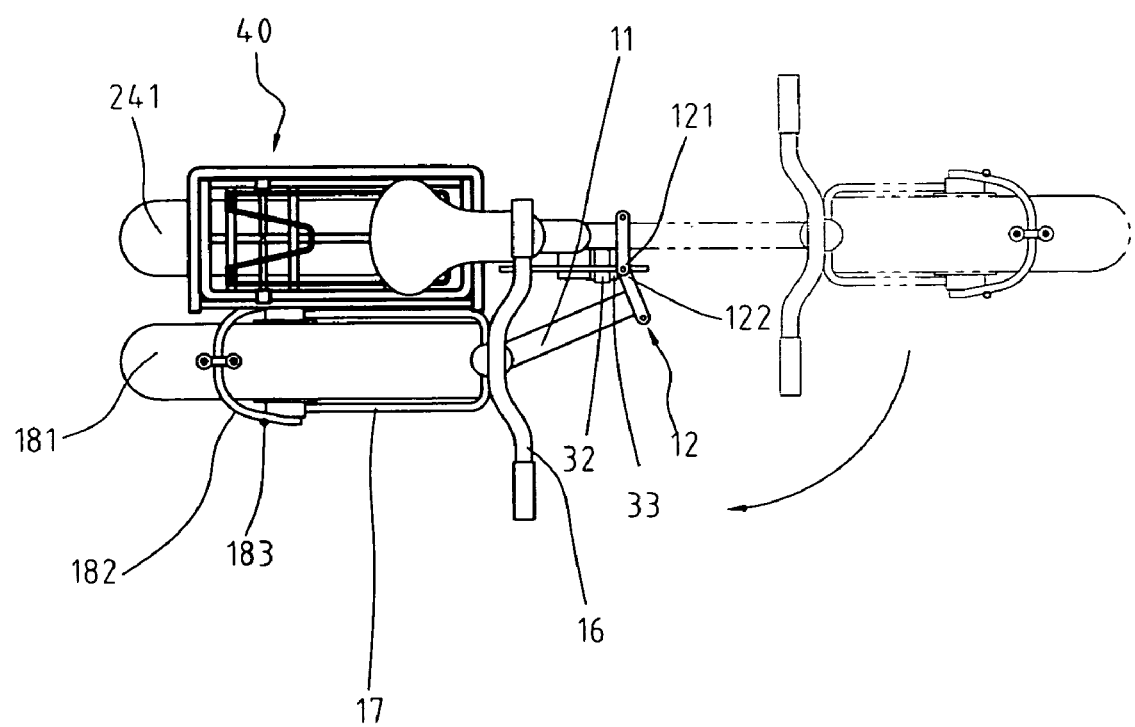
FIG. 4B shows that a top tube is folded backward.

With reference to the drawings and in particular to FIG. 1, a foldable bicycle in accordance with the present invention comprises a frame including a top tube 11 connected between a down tube 19 and a head tube 13. A front fork 17 is connected to the head tube 13 and a front wheel 18 is connected to the front fork 17. A first fender 181 is located above the front wheel 18 and connected by two support rods 182 which are connected to two ends of a hub of the front wheel 18. A handlebar stem 14 is connected to the head tube 13 and a handlebar 16 is connected to the handlebar stem 14. A seat stem 20 is connected to the down tube 19 and a seat 21 is connected on the seat stem 20. A pair of seats stay 23 and a chain stay are connected to the down tube 19, and a rear wheel 24 is connected to the seat stay 23. A second fender 241 is located above the rear wheel 24 and connected to two support rods 44 which are connected to a hub of the rear wheel 24 and a carry rack 40 connected to the down tube 19. A sprocket 22 is connected to a bottom bracket on the down tube 19 and a chain is connected between the sprocket 22 and at least one gear on the hub of the rear wheel 24. A first foldable device 12 is connected to the top tube 11 which is able to be folded at the first foldable device 12 to pivot the front wheel 18 backward to be parallel with the rear wheel 24 as shown in FIG. 4B. At least one assistant wheel 33 is connected to a lower end of the down tube 19 so that the at least one assistant wheel 33 is cooperated with the front and rear wheels 18, 24 to form a stable support arrangement when the top tube 11 is folded backward. The at least one assistant wheel 33 is in contact with the ground so that the folded bicycle can be easily moved. A second foldable device 15 is connected between the head tube 13 and the handlebar stem 14 so that the handlebar 16 can be pivoted to a desired angle and a user can conveniently move the folded bicycle by pushing the handlebar 16.

Figure 2A:
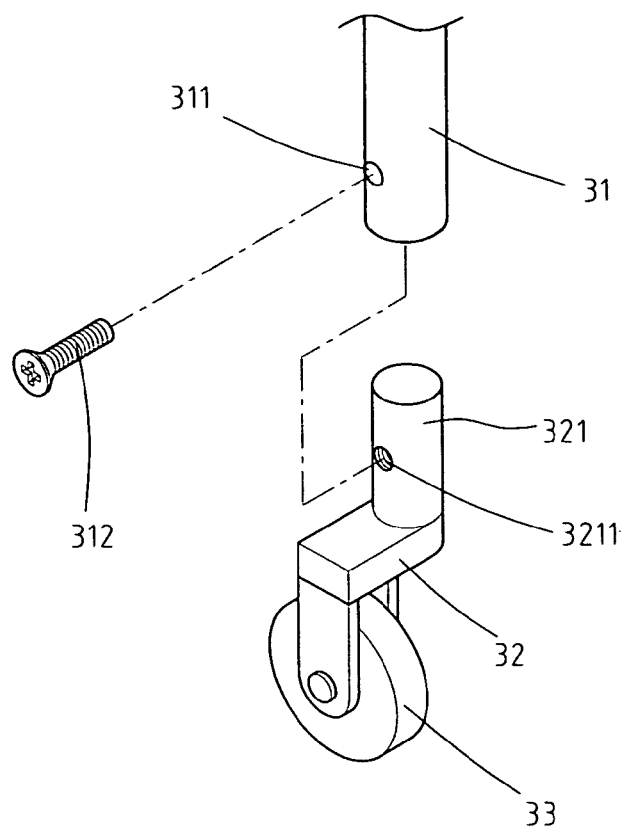
FIG. 2A is an exploded view to show that an assistant wheel is connected to a plate and an insertion is connected to the plate so as to be connected to an extension tube.

As shown in FIG. 2A, the at least one assistant wheel 33 is a single wheel and is connected to an end of a plate 32. The other end of the plate 32 is connected to an extension tube 31 extending from the lower end of the down tube 19. The plate 32 has an insertion 321 on said the other end and the insertion 321 is connected with the extension tube 31 by a bolt 312 extending through a hole 311 in the extension tube 31 and being threadedly engaged with a threaded hole 3211 in the insertion 321.

Figure 2B:
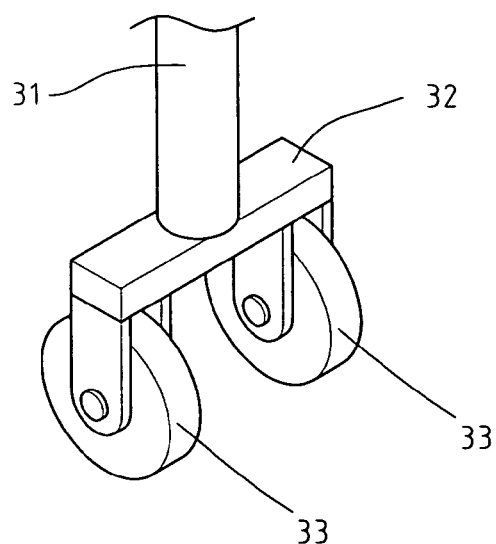
FIG. 2B shows that two assistant wheels are connected to the plate which is connected to the extension tube.

As shown in FIG. 2B, the at least one assistant wheel 33 can also be two assistant wheels 33 which are connected to two ends of the plate 32. The extension tube 31 is connected to a mediate portion of the plate 32. The two assistant wheels 33 are cooperated with the front and rear wheels 18, 24 to form a parallelogram arrangement so that the folded bicycle stands in stable manner. The at least one assistant wheel 33 can also be a caster which allows the at least one assistant wheel 33 to be rotated in any direction.

Figure 2C:
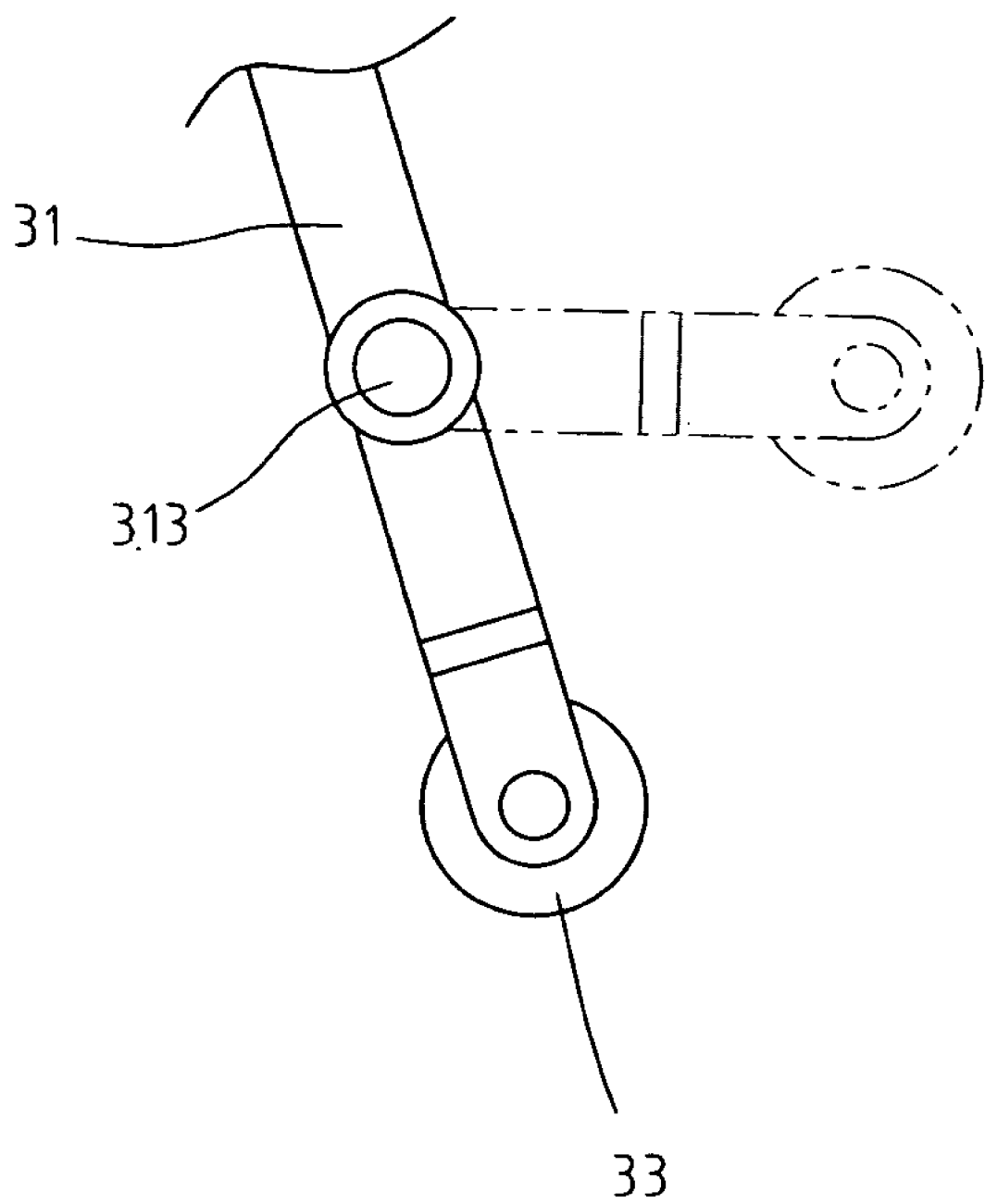
FIG. 2C shows that the extension tube can be pivoted upward relative to a down tube.

As shown in FIG. 2C, the extension tube 31 has a third foldable device 313 connected thereto so that the at least one assistant wheel 33 can be pivoted upward when the bicycle is ridden. The upward folded at least one assistant wheel 33 is located at a distance from the ground so that it does not hit the ground during riding. The at least one assistant wheel 33 can be connected to the down tube 19 by any known ways. The third foldable device 313 can be any foldable mechanism and the at least one assistant wheel 33 can be well positioned when it is pivoted upward.

Figure 3A:
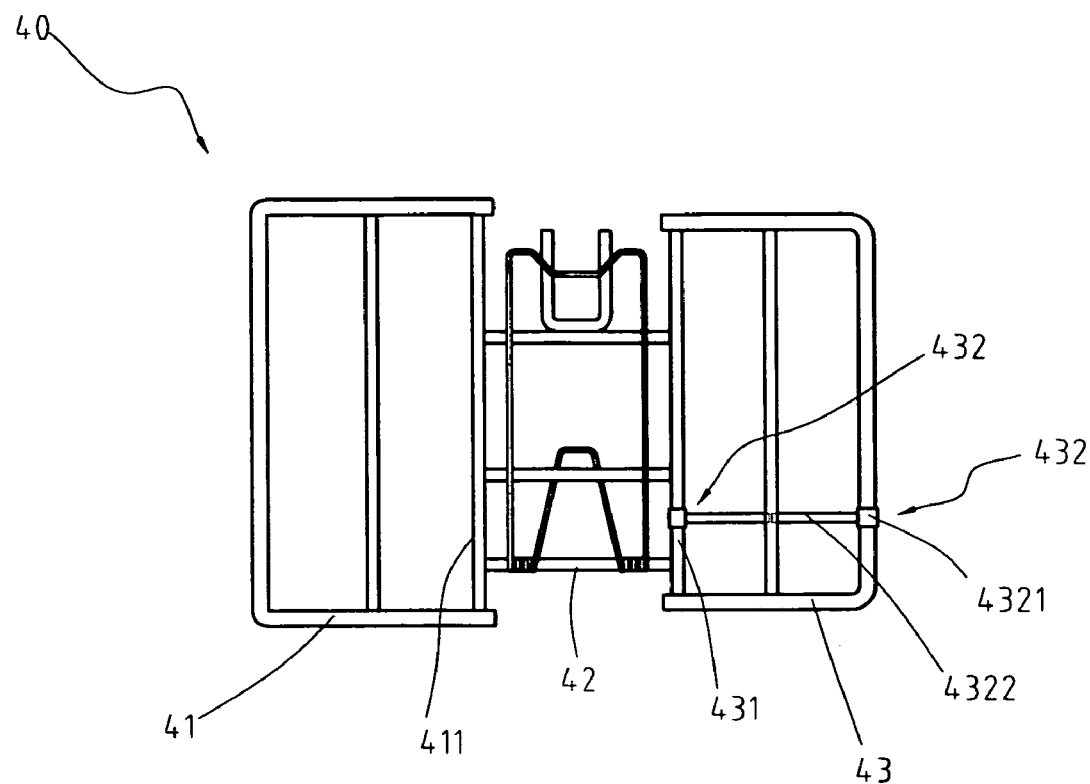
FIG. 3A shows that a carry rack is in its expanded status.
Figure 3B:
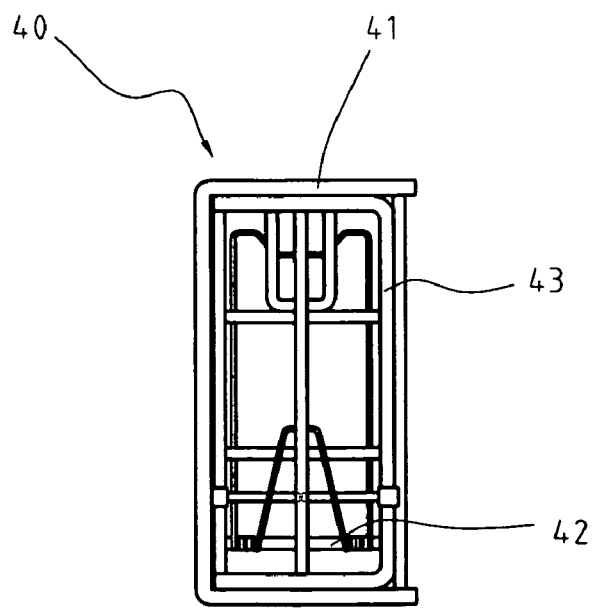
FIG. 3B shows that the carry rack is in its folded status.

As shown in FIGS. 3A and 3B, the carry rack 40 includes a main frame 41, a connection frame 42 and an extension frame 43. The main frame 41 includes a first connection rod 411 and the connection frame 42 has one side pivotably connected to the first connection rod 411. The extension frame 43 includes a second connection rod 431 to which the other side of the connection frame 42 is pivotably connected. The extension frame 43 includes two pivot rods 432 and each of which includes a pivotable portion 4321 and a connection rod 4322. The connection frame 42 can be pivotably overlapped on the main frame 41 about the first connection rod 411, and the extension frame 43 can be pivoted about the second connection rod 431 and overlaps on the connection frame 42 to reduce the area of the carry rack 40 when the bicycle is folded as shown in FIGS. 3B and 4B.

Further referring to FIGS. 1 and 4B, the support rods 182 each have an engaging member 183 which is sized to accommodate the pivot rod 432. When folding the bicycle, the top tube 11 is folded at the first foldable device 12 and the front wheel 18 is pivoted to be parallel to the rear wheel 24, and the pivot rod 432 is engaged with the engaging member 183 to position the front wheel 18 to the rear wheel 24. Therefore, the folded bicycle is well supported by the at least one assistant wheel 33 and the front and rear wheels 18, 24. The user can easily move the folded bicycle by holding the handlebar 16 and pushing the folded bicycle by the at least one assistant wheel 33 and the front and rear wheels 18, 24. The position of the handlebar 16 can be adjusted by the second foldable device 15 such that the user can hold the handlebar 16 comfortably. The length of a link 121 of the first foldable device 12 can be set according to the size of the frame to ensure that the engaging member 183 accommodates the pivot rod 432.

Figure 5A:
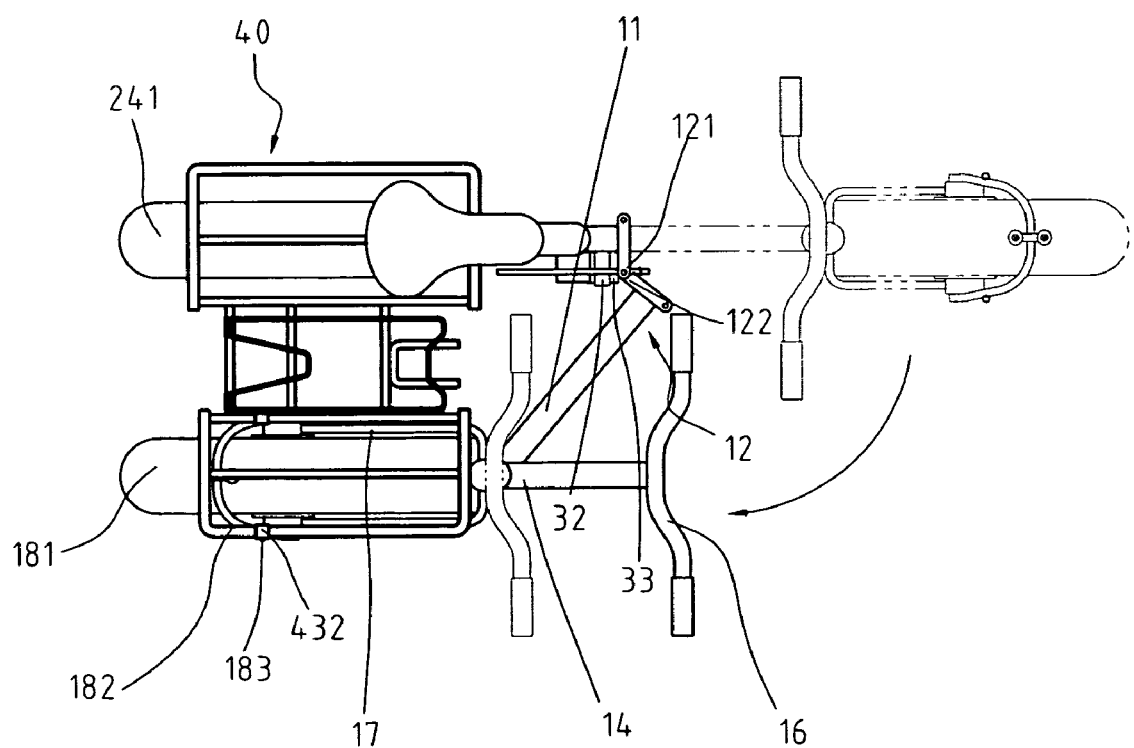
FIG. 5A shows that the carry rack is in expanded status when the top tube is folded backward.
Figure 5B:
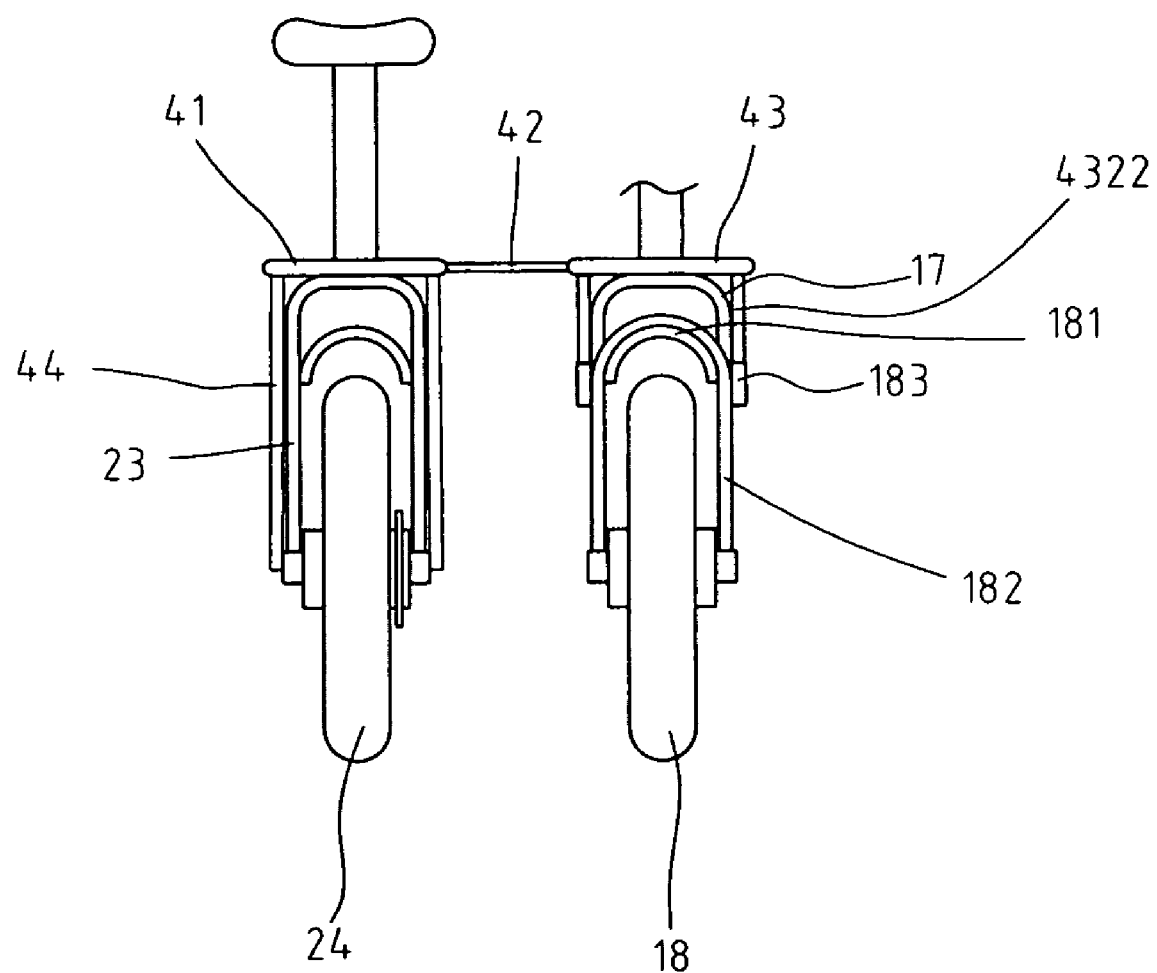
FIG. 5B is a left side view of the folded bicycle in FIG. 5A.

Referring to FIGS. 5A and 5B, the first foldable device 12 may include two links 121, 122 which allow the front wheel 18 is folded backward at a gap from the rear wheel 24, while the carry rack 40 is in its expanded status. The extension frame 43 is located above the front wheel 18. The pivot rod 432 of the extension frame 43 is then pivoted to let the connection rod 4322 be engaged with the engaging member 183. Because the carry rack 40 is in its expanded status, the folded bicycle can be used as a cart to carry goods on the carry rack 40.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A foldable bicycle comprising:

a frame including a top tube, a down tube, a head tube, a front fork connected to the head tube and a front wheel connected to the front fork, a handlebar stem connected to the head tube and a handlebar connected to the handlebar stem, a seat stem connected to the down tube and a seat connected on the seat stem, a pair of seat stay and chain stay connected to the down tube, a rear wheel connected to the seat stay, and a carry rack located above the rear wheel;

a first foldable device connected to the top tube which is folded at the first foldable device;

at least one assistant wheel connected to a lower end of the down tube, and two support rods connected to a hub of the front wheel and two engaging members connected to the two support rods respectively, the carry rack including two pivot rods which are sized to be engaged with the engaging members when the top tube is folded at the first foldable device, wherein the carry rack includes a main frame, a connection frame and an extension frame, the main frame is connected to a hub of the rear wheel, the connection frame is pivotably overlapped on the main frame, and the extension frame includes the engaging rods.

* * * * *